April 7, 1942.  W. H. EMERSON  2,278,513
CUT-OFF APPARATUS FOR PLASTIC MATERIAL
Filed Dec. 30, 1939  5 Sheets-Sheet 1

Fig. 1.

WITNESSES:
A.B.Wallace.
V.A.Peckham.

INVENTOR.
Walter H. Emerson
BY Brown, Critchlow & Flick
his ATTORNEYS.

April 7, 1942. W. H. EMERSON 2,278,513
CUT-OFF APPARATUS FOR PLASTIC MATERIAL
Filed Dec. 30, 1939 5 Sheets-Sheet 2

Fig. 2.

WITNESSES:
A. B. Wallace.
V. A. Peckham.

INVENTOR.
Walter H. Emerson
BY Brown, Critchlow & Flick
his ATTORNEYS.

April 7, 1942. W. H. EMERSON 2,278,513
CUT-OFF APPARATUS FOR PLASTIC MATERIAL
Filed Dec. 30, 1939 5 Sheets-Sheet 5

WITNESSES
a B Wallace
V. A. Beckham

INVENTOR.
Walter H. Emerson
BY Brown, Critchlow & Flick
his ATTORNEYS.

Patented Apr. 7, 1942

2,278,513

UNITED STATES PATENT OFFICE 2,278,513

CUTOFF APPARATUS FOR PLASTIC MATERIAL

Walter H. Emerson, East Liverpool, Ohio, assignor to The Homer Laughlin China Company, Newell, W. Va., a corporation of Delaware Application December 30, 1939, Serial No. 311,719

22 Claims. (Cl. 25—11)

This invention relates to apparatus for periodically severing portions or blanks from a body of plastic material, and more particularly to cut-off apparatus for pugs of clay used in making dinnerware articles and the like.

In certain types of automatic machinery, such as that used for making dinnerware, disc-like blanks of clay are placed on molds at a feeding station from which the molds are carried to another station where the blanks are shaped over the molds. It is highly desirable in the manufacture of high-grade dinnerware by these machines that the blanks be quickly and accurately centered on the molds at the feeding station, and that they be of uniform size. Heretofore, apparatus has been lacking for accurately and rapidly feeding blanks to molds, the problem being complicated by the desire to form thin blanks at the feeding station by severing them from an axially moving pug advancing continuously toward the molds.

It is among the objects of this invention to provide apparatus for rapidly forming disc-like blanks of clay or the like and correctly positioning each one on a mold. More specific objects are to provide such apparatus which periodically severs a thin blank of uniform thickness from the end of an axially moving pug advancing continuously toward the molds at a feeding station, and which centers the blanks on the molds. A further object is to provide feeding and cutting apparatus that is substantially continuous in operation, whereby time is not lost between pugs.

The cut-off apparatus constructed in accordance with this invention is most suitably used with downwardly moving pugs of plastic material, such as clay. The apparatus comprises broadly an elongate severing member, at least as long as the diameter of the pug, and means for carrying the severing member from a starting point transversely through the pug to form a disc-like blank, and then around the side of the pug back to the starting point for repeating the cycle. The severing member is carried by means supported by the tube from which the pug is ejected, and may be adjustable axially of the tube for cutting blanks of greater or less thickness. In one embodiment of the invention the severing member travels first under one and then the other of a pair of tubes so that a pug in one tube can be cut as soon as the other pug is consumed. In such a case means is provided for synchronizing the cutting operation for either pug with the indexing of the molds below them.

Suitable cut-off apparatus comprises a ring surrounding the pug, and means for rotating this ring. An elongate severing member, such as a wire, is carried by the ring so that every time the ring makes a complete revolution the severing member is carried transversely through the continuously advancing pug and cuts a disc from the lower end thereof.

The invention is illustrated in the accompanying drawings in which.

Figure 1:
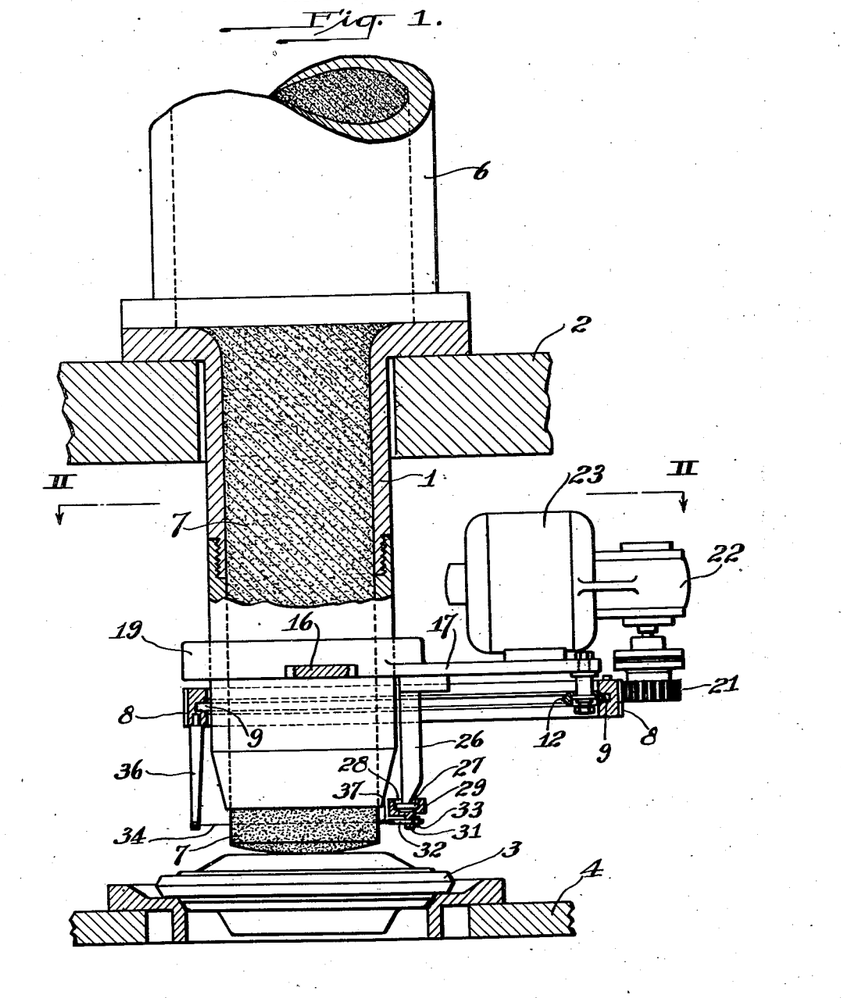
Fig. 1 is a side view, partly in section, of my cut-off apparatus associated with a tube from which plastic material is being continuously ejected or extruded.

Referring to Fig. 1 of the drawings, a vertically disposed cylindrical tube 1 is suspended from a suitable support 2 with its lower end in close proximity to a dinnerware mold 3 supported below it by a suitable mold carrier, such as an intermittently rotating table 4 of an automatic machine for making dinnerware and the like. The plastic material of which the dinnerware is made, generally clay, is supplied from a magazine 6 to tube 1 from the lower end of which it is extruded in the form of a compact pug 7 by pressure applied to the plastic material in the magazine by any suitable means (not shown). The tube is approximately coaxial with the mold when the latter is momentarily held in fixed position below it by table 4.

Figure 2:
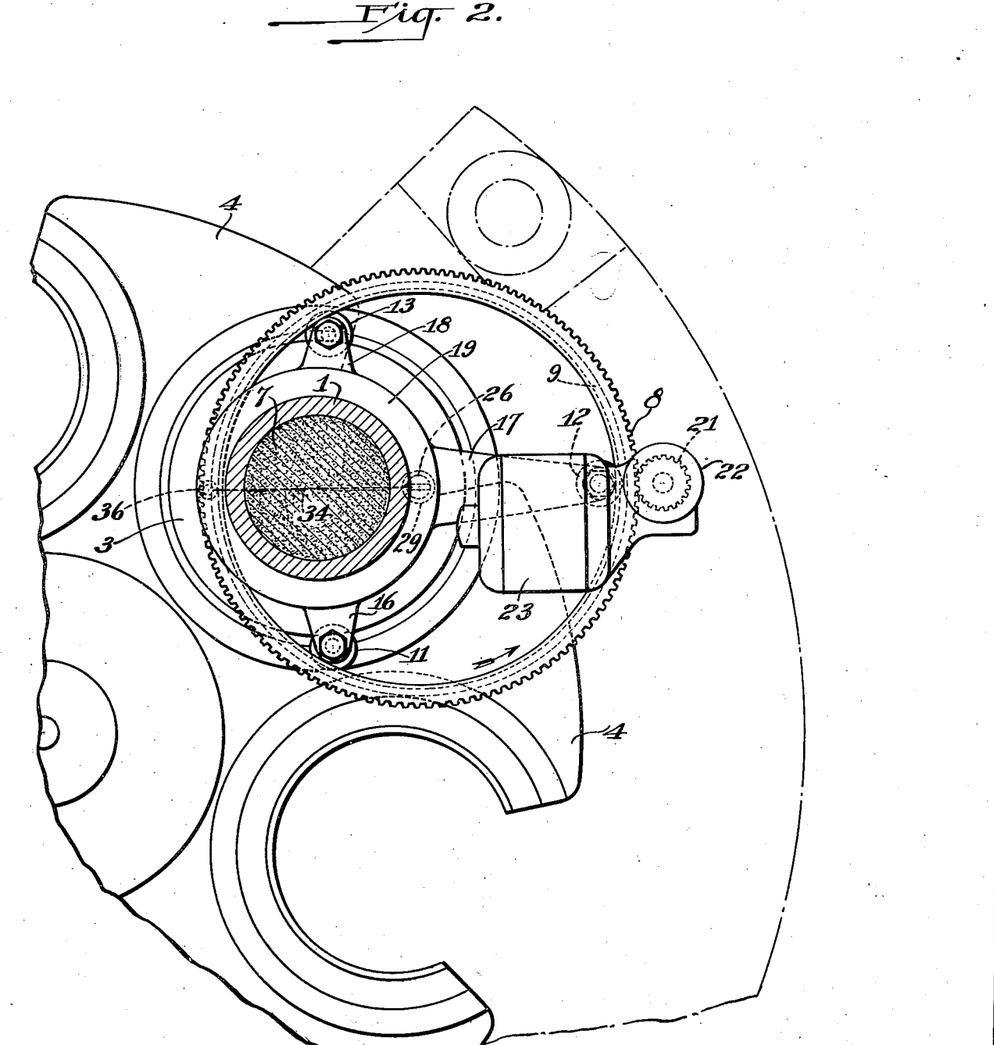
Fig. 2 is a view taken on the line II—II of Fig. 1 showing the cut-off apparatus in plan disposed over a mold-carrying table.

It is a feature of this invention that a disc-like blank is periodically severed from the advancing lower end of the pug and dropped on the center of the mold. Accordingly, surrounding tube 1 there is a ring 8, the axis of which is disposed at one side of the tube. For supporting the ring in a plane substantially perpendicular to the tube axis, its inner surface is preferably provided with an annular groove 9 into which project three wheels 11, 12 and 13 that are rotatably suspended from the outer ends of three horizontal arms 16, 17 and 18, respectively, projecting laterally from a collar 19 encircling the tube and secured thereto (Fig. 2). The edges of the annular groove diverge, and the wheels are beveled so as to engage these edges and project into the groove for supporting the ring. The ring may be rotated in any convenient manner, but it is preferred to provide the outer surface of the ring with gear teeth, and to rotate it by a pinion 21 driven through a speed reduction unit 22 by an electric motor 23 mounted on wheel-supporting arm 17. The motor may be driven intermittently in coordination with automatic positioning of molds beneath the pug, or it may be driven continuously in like coordination.

Connected at its upper end to collar 19 adjacent the axis of the ring gear is an upright arm 26, on the lower end of which a cylindrical roller 27 is journaled on an axis coinciding with that of the ring. This roller is disposed in the socket 28 of a block 29 that is shrunk on the roller to connect them rigidly together. The bottom of the block is provided with a depending lug 31 having an opening therethrough for slidably receiving a pin 32, on one end of which a nut 33 is threaded. Connected to the opposite end of this pin is the inner end of a severing or cut-off member, preferably a wire 34, the outer end of which is connected to the lower end of a pin 36 projecting downwardly from ring 8. Pin 36 and arm 26 are long enough to position the cut-off wire below the end of tube 1 where it cuts transversely through the downwardly moving pug 7 during each revolution of the ring. The wire is held taut by the nut on pin 32 and a coil spring 37.

The speed of rotation of the ring gear and the extrusion rate of the pug are so related that blanks of the desired thickness are cut from the pug. As the cut-off wire travels in the same direction all of the time, it always starts through the pug from the same side. Consequently, the blanks cut from the pug have parallel upper and lower surfaces even though the pug is continuously moving downwardly. Of course, due to the movement of the pug, the two sides of each blank are slightly oblique to its axis, but this is immaterial because the blank is thin and is soon spread out over the mold. As the cut-off wire travels in a single plane substantially perpendicular to the axis of the pug, and is carried around the side of the pug between each successive severing operation, the path of movement of the wire does not interfere with the lower end of the pug being disposed close to the mold. As a result, a blank severed from the pug has such a short distance to fall that it is certain to strike the center of the mold. Furthermore, due to the fact that the blank drops flat upon the mold, instead of being cut off from the pug while on edge and having to topple over onto the mold, the blank can be very thin, which is obviously desirable.

In the embodiment of the invention shown in Figs. 3 to 7 a pair of vertical tubes 51 and 52 are disposed with their lower ends directly above a pair of molds 53 and 54, respectively, carried by an intermittently rotating table 56 that indexes the molds from one station to another of an automatic machine. The reason for having two tubes is to eliminate the expense due to idleness of the machine which would otherwise occur during the period required for refilling a single tube with clay after it has been emptied. With two tubes the empty tube can be refilled while blanks are being cut from the pug in the other tube, so that blanks are fed continuously to the cut-off apparatus.

Figures 4, 5:
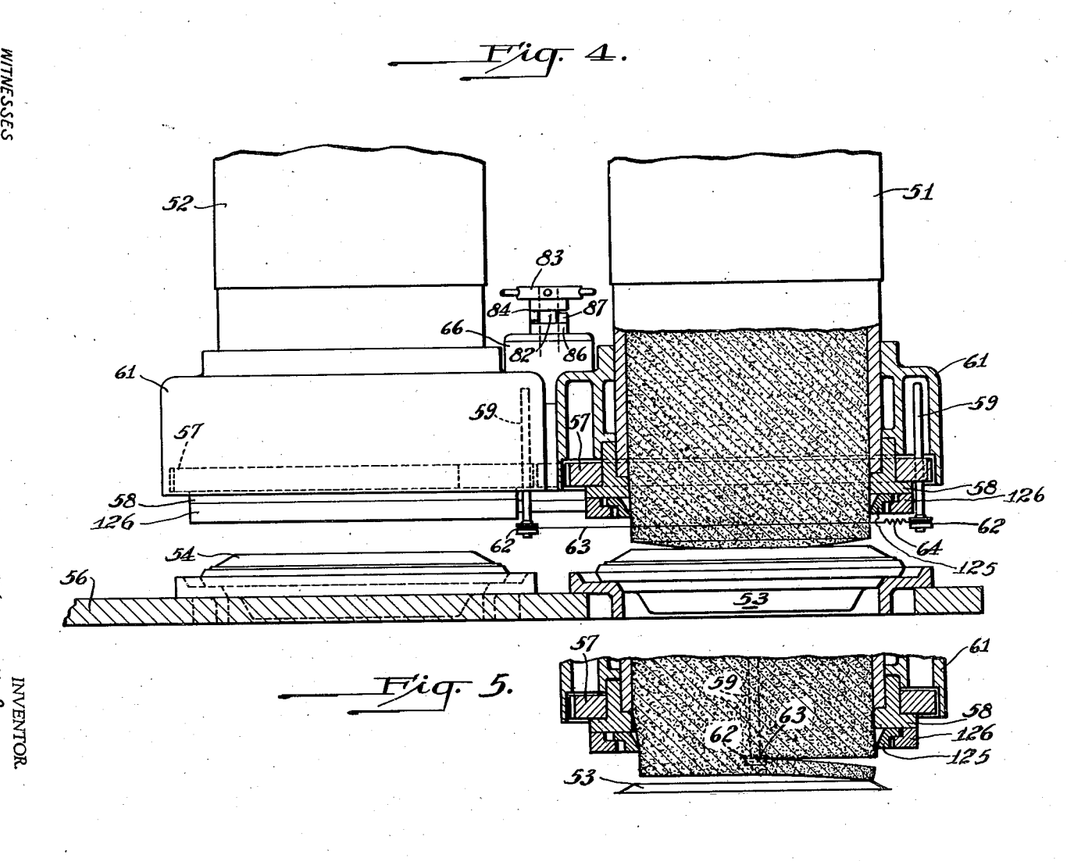
Fig. 4 is an enlarged view taken on the line IV—IV of Fig. 3.
Fig. 5 is a fragmentary vertical section taken on the line V—V of Fig. 3.
Figure 8:
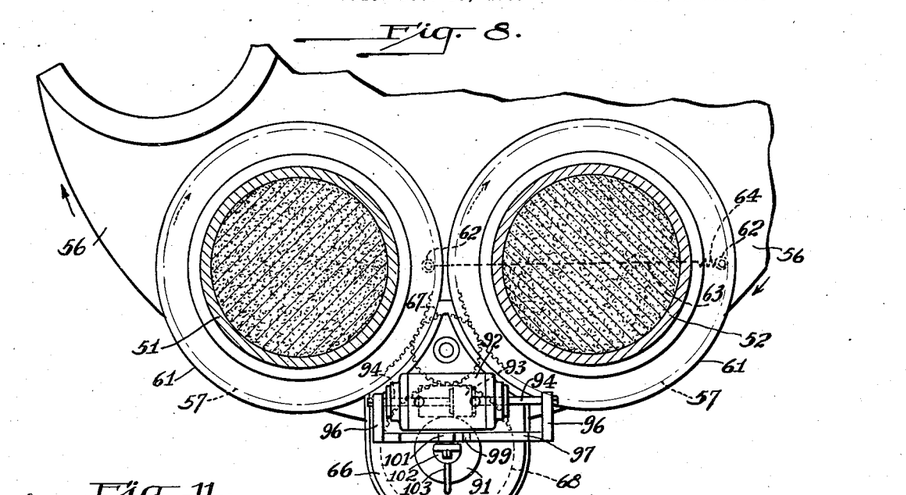
Fig. 8 is a view similar to Fig. 3 of a modification of the cut-off synchronizer.
Figure 9:
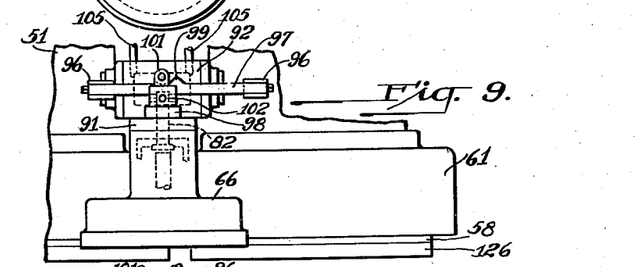
Fig. 9 is a fragmentary elevation of Fig. 8.

To sever blanks from the lower ends of the pugs, the lower end of each tube is encircled by an externally toothed ring 57 rotatably supported by an annular bearing member 58 secured to the tube, as shown in Fig. 4. Each ring is provided in the same relative position with a vertical opening in which a vertically adjustable pin 59 is retained by a set screw or the like. The rings and pins are enclosed, and the rings are held down on their supports, by annular housing members 61 secured to the tubes. Rotatably mounted on the lower end of each pin is a roller 62 to which one end of a cut-off wire 63 is connected. It will thus be seen that when the two rings are rotated in unison in the same direction, the cut-off wire will be carried by them in a horizontal plane below first one tube and then the other. To keep the wire taut and to compensate for backlash in the drive, one end of the wire is connected to its roller by means of a coil spring 64.

Figures 3, 6, 7:
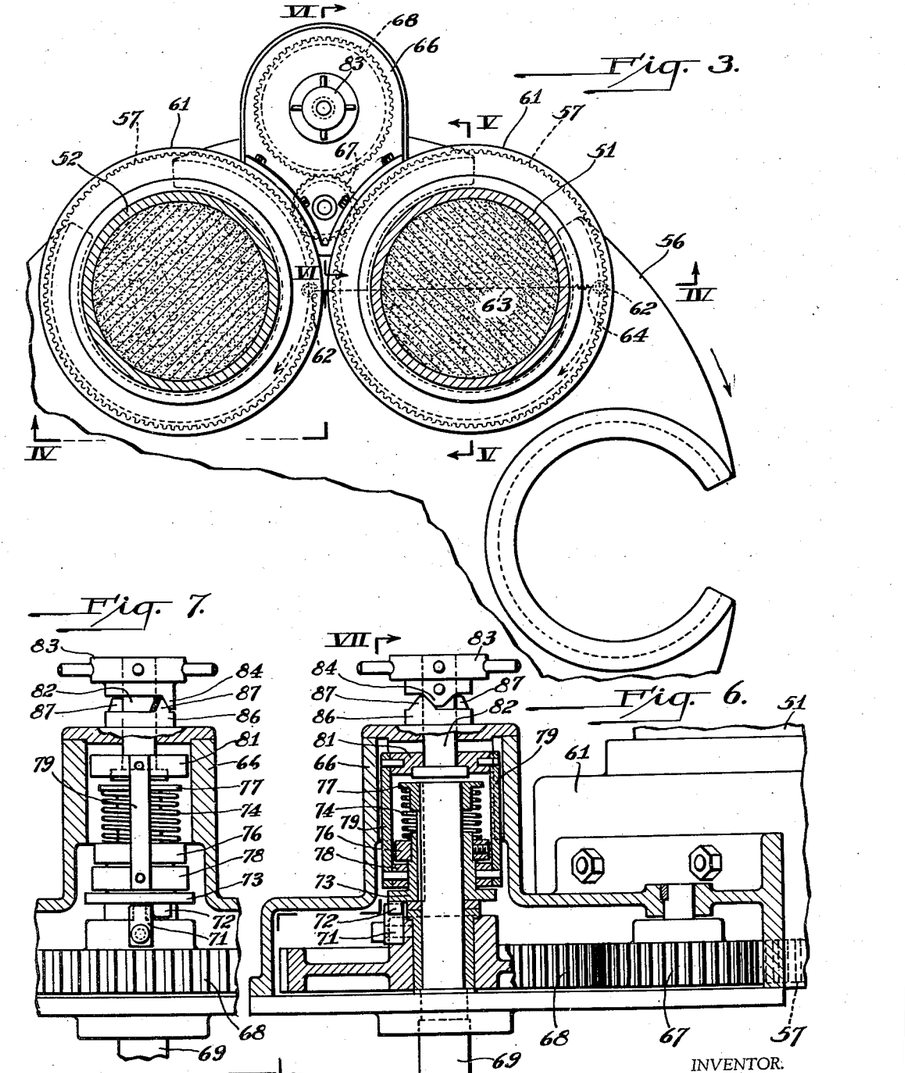
Fig. 3 is a view similar to Fig. 2 of another embodiment of the invention.
Fig. 6 is a vertical section taken on the line VI—VI of Fig. 3.
Fig. 7 is a view taken on the line VII—VII of Fig. 6.

The two rings are driven from the main drive of the machine through a gear box 66 connected to both tubes as shown in Figs. 3 and 6. This box contains a pinion 67 that meshes with the rings, and a gear 68 that drives the pinion. The gear is rotatably mounted on a vertical drive shaft 69 that extends upwardly from the main drive of the machine, and is normally rotated by the drive shaft through means about to be described in order to rotate the two rings.

It will be seen that if the cut-off wire passed under tube 51 while a mold was held stationary under that particular tube by the indexing table 56, the table would be moving the mold to the next station (under tube 52) during the time that the cut-off wire was passing from tube 51 around under the other tube and back to tube 51. In other words, as the wire passed under tube 52 the table would be moving instead of stationary. Consequently, if the first tube were exhausted and it was desired to feed clay from the second tube, blanks would be cut therefrom while the molds were in motion.

To avoid such a condition means is provided for synchronizing the cutting operation under either tube, as desired, with the indexing of the table. Accordingly, the rate of travel of the cut-off wire is changed momentarily at the time it is desired to shift the cutting from one tube to the other in order to change the position of the wire relative to the table while the latter is stationary so that it will cut the new pug only when a mold is stationary below it. Preferably, this is accomplished by stopping the cut-off wire for a period of time equal to the time required for the wire to make a half cycle, so that the wire will pass through the new pug while the table is stationary. For this purpose gear 68 is provided with half as many teeth as each of the rings 57, and its rotation can be stopped at will for one complete revolution relative to the drive shaft, whereby the rings stop for only a half rotation. As shown in Figs. 6 and 7, the clutch by which the gear is operatively connected to the drive shaft comprises an upwardly extending detent or lug 71 the side of which is normally engaged by another detent or lug 72 projecting downwardly from a sleeve 73 splined on the drive shaft above the gear. This sleeve is biased downwardly by means of a coil spring 74 encircling the shaft between a collar 76 secured to the sleeve and a flanged member 77 at the upper end of the shaft. Loosely mounted on the sleeve below its collar is a ring 78 that is suspended by links 79 from a disc 81 carried by the lower end of a pin 82 slidably and rotatably mounted in the top of the gear box. Rigidly mounted on the upper end of this pin is a hand wheel 83 provided with a depending tapered lug 84 that travels on a ring 86 rigidly mounted on the gear box and provided with a pair of diametrically opposite upwardly projecting tapered lugs 87.

When it is desired to shift the cutting operation from one tube to the other hand wheel 83 is turned to cause its lug to travel over the adjoining underlying lug of ring 86. This operation forces pin 82 upward momentarily, whereby lower ring 78 is raised and in turn lifts sleeve 73 by its collar. While the hand wheel lug is passing over the stationary lug below it, sleeve lug 72 is pulled out of engagement with gear lug 71 temporarily, and the sleeve therefore rotates with the drive shaft without rotating gear 68 until the sleeve lug, moved downwardly again by spring 74, has made a full revolution and again engages the gear lug.

Figs. 8 to 11 illustrate a way in which pin 82 of Fig. 6 can be raised automatically instead of by hand wheel 83. This is done by fluid pressure operated means connected in circuit with the fluid pressure cylinders that force the clay from the lower ends of tubes 51 and 52 so that the cut-off wire will be automatically synchronized with the tube from which the clay is being extruded.

A plate 91 is mounted on top of gear box 66 and extends inwardly toward tubes 51 and 52 in order to support a small fluid pressure cylinder 92 in which a piston 93 is reciprocable horizontally. Connected to the opposite sides of the piston are a pair of piston rods 94 that extend through the ends of the cylinder. The outer ends of the rods carry laterally extending arms 96 the outer ends of which are connected together by a cross bar 97 that is slidably supported on a block 98 (Fig. 10) mounted on top of plate 91. The central portion of this cross bar is provided with an upwardly extending tapered lug 99 which is adapted to engage and raise a roller 101 rotatably supported by a bracket 102 secured to the upper end of pin 82 which extends upwardly through the plate and block.

Figure 10:
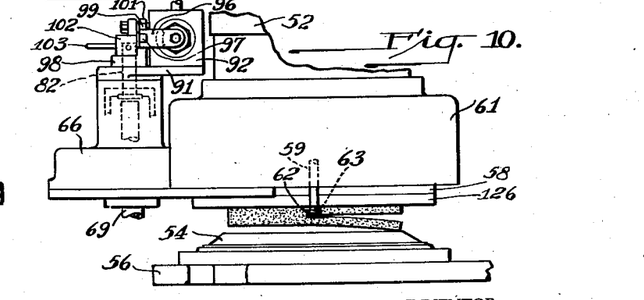
Fig. 10 is a side view turned 90 degrees from Fig. 9.

When piston 93 is moved from one end to the other of the cylinder the lug on cross bar 97 engages roller 101 and thereby raises the bracket and pin 82 while it passes under the roller. To permit pin 82 to be raised manually when desired, bracket 102 is provided with a laterally extending pin 103.

Figure 11:
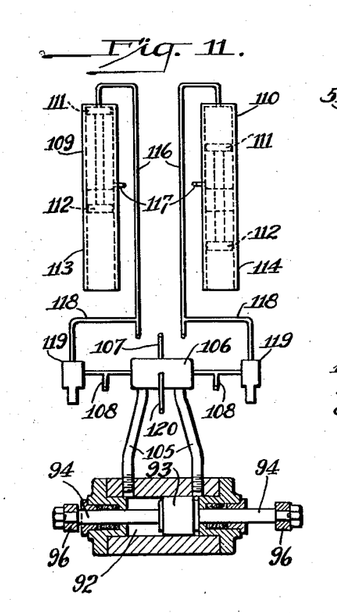
Fig. 11 shows the cylinder of the cut-off synchronizer in vertical section in the diagrammatically depicted fluid pressure circuit connected with the apparatus that feeds the plastic material to the cut-off mechanism.

As shown in Fig. 11 the opposite ends of the interior of cylinder 92 are connected by tubes 105 to a source of fluid under pressure. This connection is preferably made through a pilot valve 106, such as shown in the copending application of Walter H. Emerson and William Denison, Serial No. 323,166, filed March 9, 1940, with a pipe 107 to which the pressure fluid is supplied. This pilot valve controls, through pipes 108, other valves (not shown) that admit fluid under pressure to and release it from the opposite ends of cylinders 109 and 110 in which are disposed pistons 111 that force plungers 112 through tubular magazines 113 and 114 that are filled with clay. The fluid is supplied to the rear ends of the cylinders through pipes 116, and exhausted from their front ends through pipes 117. The outlet ends of the magazines are connected by suitable tubular conduits (not shown) to tubes 51 and 52 (Fig. 8), whereby clay forced out of the magazines by the plungers is extruded from the lower ends of the tubes. As shown in the above-mentioned Emerson and Denison application, only one of the cylinders 109 and 110 operates at a time to extrude clay from its associated magazine, and pilot valve 106 shifts the operation from that cylinder to the other as soon as the clay from the first magazine has been exhausted. The pilot valve is operated automatically for this purpose by the increase in fluid pressure that occurs behind one of the pistons 111 when that piston reaches the forward limit of its stroke. This increased pressure acts through the associated pipe 116 and a branch pipe 118 to open a check valve 119 connected to one of the pipes 108 and the pilot valve. An increase in pressure in either end of the pilot valve trips it, and when it is in either one of its two positions fluid under pressure from pipe 107 is connected by the pilot valve with one of the tubes 105 leading to cylinder 92, and the other tube is connected through a pipe 120 with a tank or the like (not shown).

It will thus be seen that as soon as piston 111 reaches the forward limit of its stroke in cylinder 110, which means that the clay from magazine 114 has been exhausted, the fluid pressure behind that piston builds up until it trips pilot valve 106 which in turn causes piston 93 to move to the opposite end of cylinder 92 and thereby synchronize the operation of the cut-off wire with indexing of molds under the clay column that starts to be fed to the machine by cylinder 109 to the rear end of which fluid under pressure was admitted when the pilot valve was tripped.

It will be realized that as the wire cuts through a pug the portion of the blank that is first severed from the pug bends downwardly into contact with the mold. In doing this it swings inwardly as shown in Fig. 5. Therefore, if the axis of the lower end of the pug is concentric with the axis of the mold, the blank will not be exactly centered on the mold. To prevent this from happening I offset the axis of the pug relative to the axis of the mold in the direction from which the cut is started. This is preferably accomplished by providing the tube with a nozzle 125 that may be adjusted laterally in any direction an amount sufficient to assure centering of a blank on an underlying mold. The nozzle is detachably clamped against the bottom of bearing member 58 by a clamping ring 126. Nozzles of various diameters for blanks of different sizes may thus be interchangeably connected to the clay tube. Fig. 5 shows the axes of the tube and mold concentric, and the concentric axes of the nozzle and the emerging portion of the pug offset relative to the mold axis in the direction from which the cut is started.

It should be particularly noted that with the apparatus disclosed in this application clay blanks can be cut which are substantially the same diameter as the molds. This is because they can be cut very thin so that it is not necessary to press them out much thinner on the molds and thereby cause them to increase in diameter. The reason that the blanks can be cut so thin is that they are cut above and close to the molds so that they drop substantially flat on the molds. Heretofore, where blanks were cut from the end of a horizontal pug they had to be thick enough to be self-supporting so that they would fall through an arc around their lower edge and not fold up before they struck the molds. Being thick, they had to be pressed out thin on the molds, and therefore the blanks were made considerably smaller than the molds to allow for their increase in diameter when pressed thin.

By feeding clay from tubes 51 and 52 simultaneously and cutting blanks from both clay columns at once, such as by simultaneously-operating independent cut-off means of the type shown in Fig. 1, two blanks of clay can be supplied to the same mold. Thus, by using a smaller clay nozzle and a clay of different color with the first tube than with the second, the larger blank can be superimposed on the smaller on the same mold to produce a plate having a center and border of different colors.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

I claim:

1. Apparatus for cutting blanks from the end of a pug of plastic material, comprising a substantially vertical tube from the lower end of which said plastic material is ejected, a ring surrounding the tube, means connected to the tube and rotatably supporting the ring, a pin projecting downwardly from the ring to a point below the tube, a wire connected at one end to the lower end of the pin, means disposed at the side of the tube and projecting downwardly below it for movably supporting the opposite end of the wire, whereby said ring carries the wire beneath the tube for periodically severing a disc from the plug.

2. Apparatus for cutting blanks of substantially uniform thickness from the end of a pug of plastic material, comprising a substantially vertical tube from the lower end of which said plastic material is continuously extruded, a ring gear encircling the tube with its axis at one side thereof and provided in its inner surface with an annular groove, a plurality of horizontal wheels spaced laterally from said tube and registering with said groove for rotatably supporting the ring gear, supporting means for said wheels connected to the tube, a pin connected to the ring gear and extending downwardly below the tube, a rotatable support connected to the tube adjacent the axis of the ring gear, a cut-off wire connected at its ends to said pin and rotatable support, a pinion meshing with the ring gear, and means for driving the pinion.

3. Apparatus for cutting blanks from the ends of pugs of plastic material, comprising a pair of adjacent tubes from the lower ends of which said plastic material is adapted to be ejected, a ring encircling each tube, means connected to the tubes for rotatably supporting the rings, a cut-off wire disposed below the tubes and connected at its ends to both rings, and means for rotating the rings to carry said wire beneath first one tube and then the other.

4. Apparatus for cutting blanks from the ends of pugs of plastic material, comprising a pair of adjacent tubes from the lower ends of which said plastic material is adapted to be ejected, a ring encircling each tube, means connected to the tubes for rotatably supporting the rings, a pin projecting downwardly from each ring to a point below the tubes, a cut-off wire connected at its ends to the lower ends of the pins, and means for rotating the rings to carry said wire beneath first one tube and then the other.

5. Apparatus for cutting blanks from the ends of pugs of plastic material, comprising a pair of adjacent tubes from the lower ends of which said plastic material is adapted to be ejected, a ring encircling each tube, means connected to the tubes for rotatably supporting the rings, a pin projecting downwardly from each ring to a point below the tubes, a roller rotatably mounted on the lower end of each pin, a cut-off wire connected at its ends to said rollers, and means for rotating the rings to carry said wire beneath first one tube and then the other.

6. Apparatus for cutting blanks from the ends of pugs of plastic material, comprising a pair of adjacent tubes from the lower ends of which said plastic material is adapted to be ejected, a ring encircling each tube, means connected to the tubes for rotatably supporting the rings, a pin projecting downwardly from each ring to a point below the tubes, a cut-off wire connected at one end to one of said pins, a coil spring connecting the opposite end of the wire to the other pin, and means for rotating the rings to carry said wire beneath first one tube and then the other.

7. Apparatus for cutting blanks from the end of a pug of plastic material, comprising a substantially vertical tube from the lower end of which said plastic material is ejected, a ring surrounding the tube, means connected to the tube and rotatably supporting the ring, a vertically adjustable pin projecting downwardly from the ring to a point below the tube, a wire connected at one end to the lower end of the pin, vertically adjustable means disposed at the side of the tube and projecting downwardly below it for movably supporting the opposite end of the wire, whereby said ring carries the wire beneath the tube for periodically severing a disc from the pug.

8. The combination with a vertical tube for feeding a pug of plastic material downwardly, a substantially horizontal cut-off wire, and means for moving the wire laterally through the projecting end of the pug to cut a disc therefrom and deposit it on a mold below, of a nozzle connected to the lower end of the tube and through which the pug is ejected, the axis of said nozzle being offset relative to the axis of the tube in the direction from which the cut is started, whereby said disc is centered on the mold.

9. The combination with mold-indexing means provided with a plurality of stations, of a pair of tubes disposed with their lower ends above a pair of adjacent stations of said means, a substantially horizontal cut-off wire, means for carrying the wire beneath first one tube and then the other to sever a blank from a pug of plastic material in one tube in synchronism with said indexing means, and means for momentarily changing the rate of operation of said wire-carrying means to synchronize the cutting of blanks from a pug in the other tube with said indexing means.

10. The combination with mold-indexing means, provided with a plurality of stations, of a pair of tubes disposed with their lower ends above a pair of adjacent stations of said means, a substantially horizontal cut-off wire, means for carrying the wire beneath first one tube and then the other to sever a blank from a pug of plastic material in one tube in synchronism with said indexing means, and means for arresting said wire-carrying means during a portion of its cycle of operation to synchronize the cutting of blanks from a pug in the other tube with said indexing means.

11. The combination with mold-indexing means provided with a plurality of stations, of a pair of tubes disposed with their lower ends above a pair of adjacent stations of said means, a substantially horizontal cut-off wire, means for carrying the wire beneath first one tube and then the other to sever a blank from a pug of plastic material in one tube in synchronism with said indexing means, continuously operating means for actuating said wire-carrying means, and means for momentarily disconnecting the wire-carrying means from its actuating means to synchronize the cutting of blanks from a pug in the other tube with said indexing means.

12. The combination with mold-indexing means provided with a plurality of stations, of a pair of tubes disposed with their lower ends above a pair of adjacent stations of said means, a ring encircling each tube, a cut-off wire disposed below the tubes and connected at its ends to both rings, means for rotating the rings to carry the wire below first one tube and then the other, and means for disconnecting said rings from their rotating means for a predetermined interval.

13. The combination with mold-indexing means provided with a plurality of stations, of a pair of tubes disposed with their lower ends above a pair of adjacent stations of said means, a ring encircling each tube, a cut-off wire disposed below the tubes and connected at its ends to both rings, driving means, and means including cooperating detents connecting said driving means to said rings, said detents being biased into operative engagement, and means for disengaging said detents for a predetermined interval.

14. The combination with mold-indexing means provided with a plurality of stations, of a pair of tubes disposed with their lower ends above a pair of adjacent stations of said means, a ring encircling each tube, a cut-off wire disposed below the tubes and connected at its end to both rings, a drive shaft, a driven member rotatably mounted on said shaft and operatively connected to said rings for rotating them, a driving member splined on said shaft, said driving and driven members being provided with interengaging detents whereby the former drives the latter, and means for moving said driving member axially of the shaft to temporarily disengage said detents.

15. The combination with a vertical tube for feeding a pug of plastic material downwardly, a substantially horizontal cut-off wire, and means for moving the wire laterally through the projecting end of the pug to cut a disc therefrom and deposit it on a mold below, of a nozzle connected to the lower end of the tube and through which the pug is ejected, said nozzle being adjustable radially relative to the tube whereby said disc may be centered on the mold.

16. The combination with mold-indexing means provided with a plurality of stations, of a pair of tubes disposed with their lower ends above a pair of adjacent stations of said means, a substantially horizontal cut-off wire, means for carrying the wire beneath first one tube and then the other to sever a blank from a pug of plastic material in one tube in synchronism with said indexing means, and fluid pressure controlled means for momentarily changing the rate of operation of said wire-carrying means to synchronize the cutting of blanks from a pug in the other tube with said indexing means.

17. The combination with mold-indexing means provided with a plurality of stations, of a pair of tubes disposed with their lower ends above a pair of adjacent stations of said means, a ring encircling each tube, a cut-off wire disposed below the tubes and connected at its ends to both rings, driving means, and means including cooperating detents connecting said driving means to said rings, said detents being biased into operative engagement, and fluid pressure operated means for disengaging said detents for a predetermined interval.

18. The combination with mold-indexing means provided with a plurality of stations, of a pair of tubes disposed with their lower ends above a pair of adjacent stations of said means, a ring encircling each tube, a cut-off wire disposed below the tubes and connected at its end to both rings, a drive shaft, a driven member rotatably mounted on said shaft and operatively connected to said rings for rotating them, a driving member splined on said shaft, said driving and driven members being provided with interengaging detents whereby the former drives the latter, a reciprocable member for moving said driving member axially of the shaft to temporarily disengage said detents, a piston for reciprocating said member, and a fluid pressure cylinder housing the piston.

19. The combination with mold-indexing means provided with a plurality of stations, of a pair of tubes disposed with their lower ends above a pair of adjacent stations of said means, a pair of plungers for extruding a pug of plastic material from the lower end of first one tube and then the other, a substantially horizontal cut-off wire, means for carrying the wire beneath first one tube and then the other to sever a blank from the pug from one tube in synchronism with said indexing means, and means actuated when the plunger that is extruding plastic material from said last-mentioned tube reaches the forward limit of its stroke for momentarily changing the speed of travel of said wire-carrying means to synchronize the cutting of blanks from a pug from the other tube with said indexing means.

20. The combination with mold-indexing means provided with a plurality of stations, of a pair of tubes disposed with their lower ends above a pair of adjacent stations of said means, a pair of plungers for extruding a pug of plastic material from the lower end of first one tube and then the other, fluid pressure operated means for moving the plungers forward alternately independently of each other, a substantially horizontal cut-off wire, means for carrying the wire beneath first one tube and then the other to sever a blank from the pug from one tube in synchronism with said indexing means, and means actuated by a momentary increase in said fluid pressure caused by the plunger that is extruding plastic material from said last-mentioned tube reaching the forward limit of its stroke for momentarily changing the speed of travel of said wire-carrying means to synchronize the cutting of blanks from a pug from the other tube with said indexing means.

21. The combination with mold-indexing means provided with a plurality of stations, of a pair of tubes disposed with their lower ends above a pair of adjacent stations of said means, a pair of plungers for extruding a pug of plastic material from the lower end of first one tube and then the other, fluid pressure operated means for moving the plungers forward alternately independently of each other, a substantially horizontal cut-off wire, means for carrying the wire beneath first one tube and then the other to sever a blank from the pug from one tube in synchronism with said indexing means, means for momentarily changing the speed of travel of said wire-carrying means to synchronize the cutting of blanks from a pug from the other tube with said indexing means, a tripping member for actuating said rate-changing means, a piston for actuating said member, a fluid pressure cylinder housing the piston, and means connecting said cylinder with said fluid pressure.

22. Apparatus for cutting blanks from the ends of pugs of plastic material, comprising a pair of adjacent tubes from the lower ends of which said plastic material is adapted to be ejected, a ring mounted adjacent the lower end of each tube in such position that said plastic material from the tube above will pass through the ring, means rotatably supporting the rings, a cut-off wire disposed below the tubes and connected at its ends to both rings, and means for rotating the rings for carrying said wire beneath first one tube and then the other.

WALTER H. EMERSON.